United States Patent [19]
Minhas

[11] Patent Number: 5,841,100
[45] Date of Patent: Nov. 24, 1998

[54] METHOD OF MAKING ANTI-SLIP HANDLES

[75] Inventor: Kenwar A. Minhas, Plainview, N.Y.

[73] Assignee: Great Neck Saw Manufacturers, Inc., Mineola, N.Y.

[21] Appl. No.: 883,406

[22] Filed: Jun. 26, 1997

Related U.S. Application Data

[63] Continuation-in-part of Ser. No. 692,625, Aug. 6, 1996.

[51] Int. Cl.[6] .................................................. B23K 26/00
[52] U.S. Cl. ..................................................... 219/121.69
[58] Field of Search ........................ 219/121.68, 121.69, 219/121.72; 83/875, 876; 142/40, 41; 264/400

[56] References Cited

U.S. PATENT DOCUMENTS

| | | | |
|---|---|---|---|
| 3,537,340 | 11/1970 | Westbrook | 83/875 |
| 4,469,931 | 9/1984 | Macken | 219/121.72 |
| 4,709,610 | 12/1987 | Pool | 83/876 |
| 4,723,582 | 2/1988 | Caspall . | |
| 5,041,716 | 8/1991 | Wakabayashi | 219/121.68 |
| 5,225,650 | 7/1993 | Babel et al. | 219/121.69 |
| 5,373,138 | 12/1994 | Locklear et al. | 219/121.69 |
| 5,416,298 | 5/1995 | Roberts | 219/121.68 |
| 5,468,932 | 11/1995 | Jacob | 219/121.69 |
| 5,535,652 | 7/1996 | Beck et al. | 142/40 |
| 5,697,282 | 12/1997 | Schakel et al. | 83/876 |

*Primary Examiner*—Geoffrey S. Evans
*Attorney, Agent, or Firm*—Joseph J. Previto

[57] ABSTRACT

The method and mechanism of making an anti-slip handle having a gripping portion in which a plurality of grooves are formed in the gripping portion of the handle with the first set of grooves formed in one direction and the second set of grooves formed in the other direction so that the two sets of grooves intersect each other to form a cross-hatched groove network. The grooves are preferably formed by laser action.

12 Claims, 2 Drawing Sheets

METHOD OF MAKING ANTI-SLIP HANDLES

RELATED APPLICATION

This is a continuation-in-part of U.S. patent application Ser. No. 08/692,625 filed Aug. 6, 1996.

BACKGROUND

The present invention relates to anti-slip handles for hammers and the like and more particularly to a method and mechanism of making anti-slip wooden handles.

Applicant is aware of U.S. Pat. No. 4,723,582 which discloses a method of making an anti-slip wooden handle. The method described in that patent involves die-pressing a series of notches into a wooden handle at predetermined temperatures and predetermined pressures.

OBJECTS

The present invention has for one of its objects the provision of an improved mechanism method of making an anti-slip wooden handle which is simple and inexpensive to manufacture.

Another object of the present invention is the provision of an improved method of making an anti-slip handle which will use existing machinery.

Other and further objects will be obvious upon the understanding of the illustrative embodiment about to be described, or which will be indicated in the appended claims, and various advantages not referred to herein, will occur to one skilled in the art upon employment of the invention in practice.

This is accomplished by slicing a plurality of cross-hatched notches or grooves on the gripping portion of the handle. The grooves are preferably a plurality of preferably parallel grooves on each side of the handle. The grooves are oriented in different directions so that they intersect each other. The grooves are preferably formed by directing a laser beam on the handle in order to form the grooves in the handle.

DRAWINGS

A preferred embodiment of the invention has been chosen for purposes of illustration and description and is shown in the accompanying drawings forming a part of the specification wherein.

DESCRIPTION

The present invention will be described in connection with a hammer 1 which comprises a wooden handle 2 to which a metal head 3 is attached. However, it will be understood that the invention will be readily applicable to other tools with handles made of wood or some other suitable material.

Figure 1:
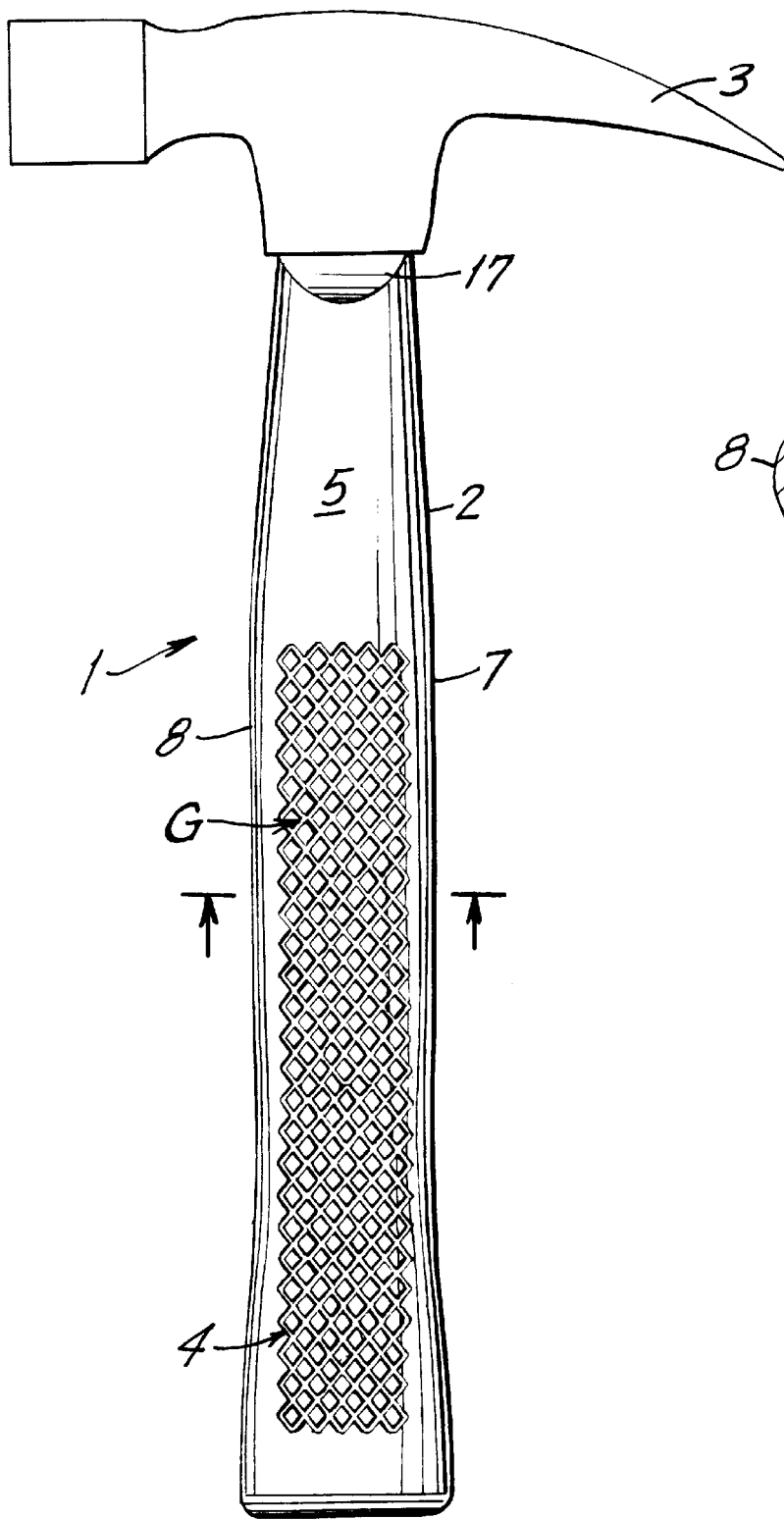
FIG. 1 is a plan view of a hammer showing its handle made in accordance with the present invention.
Figure 2:
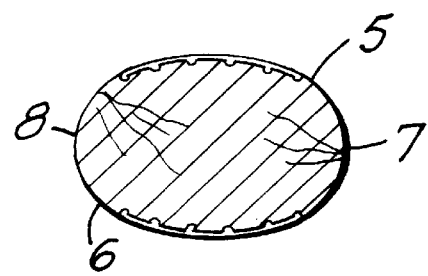
FIG. 2 is the sectional view taken along line 2—2 of FIG. 1.
Figure 3:
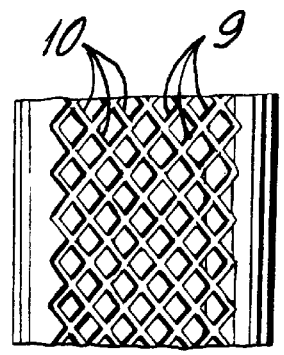
FIG. 3 is an enlarged view of the handle made in accordance with the present invention.

Referring to FIG. 1, the handle 2 has one end 17 embedded within the head 3 and its other end 18 free. The wooden handle 2, as shown in the drawings, has a gripping portion G which is oval in cross section and comprised of a pair of opposed curved surface 5 and 6, having a long radial arc, and a pair of opposed surfaces 7 and 8, having a short radial arc, connecting the surfaces 5 and 6 together.

Each surface 5 and 6 of the wooden handle 2 has a cross-hatched groove network 4 comprising a plurality of parallel grooves 9 oriented in one direction and a plurality of grooves 10 oriented in the opposite direction and intersecting grooves 9. Each set of grooves 9 and each set of grooves 10 are shown in the drawings as being parallel to each other, with the grooves 9 and 10 intersecting each other at right angles. The grooves 9 and 10 are preferably shown as being at an angle to the side edges 7 and 8. However, it will be understood that each set of grooves 9 and each set of grooves 10 need not be parallel to each other nor need the grooves 9 and 10 intersect each other at right angles without departing from the invention.

Preferably, the grooves 9 and 10 are about 0.01 to 0.02 millimeters deep. The parallel grooves 9 and 10 are spaced about 0.16 millimeters apart. The groove network 4 extends for about seven inches along each surface 5 and 6 of the wooden handle 2 and is about 1¼ inches wide on each surface. The length of each groove is approximately 1½ inches long. It will be understood that these dimensions may be changed without departing from the invention.

Figure 4:
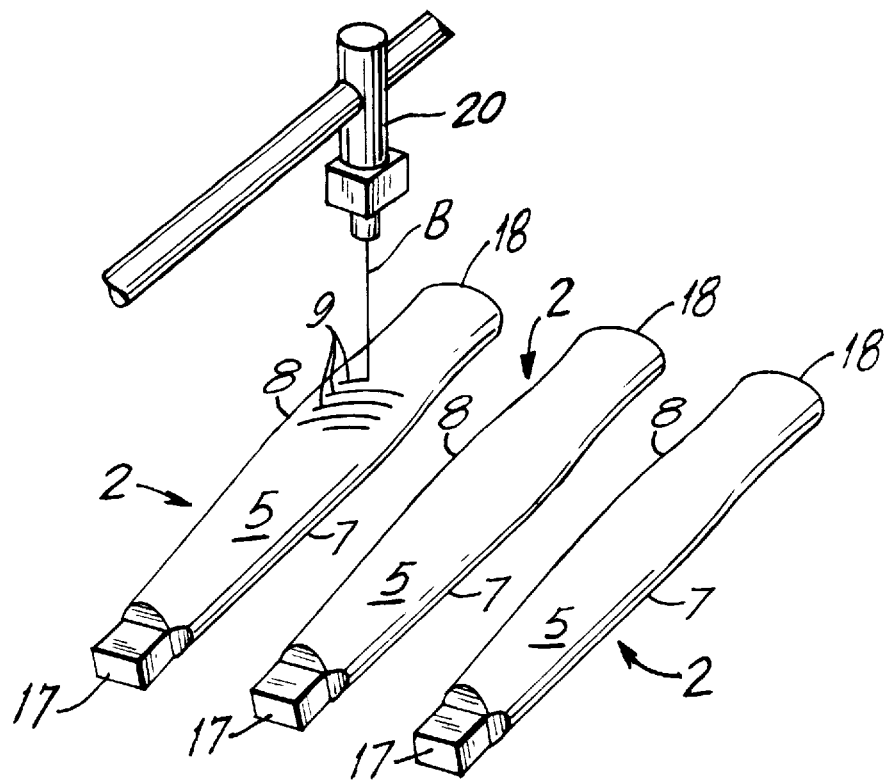
FIG. 4 is a diagrammatic view showing one step in the method of making the notches in the handle in accordance with the present invention.
Figure 5:
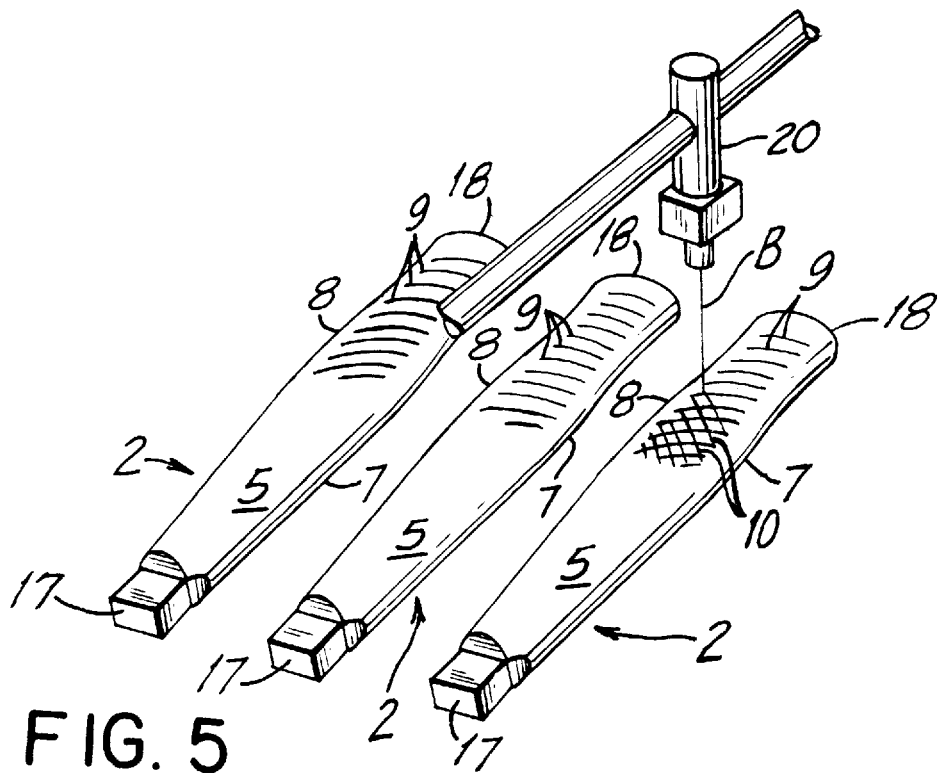
FIG. 5 is a diagrammatic view showing another step in the method of making the handle of the present invention.

The preferred method of forming the cross-hatched groove network 4 in the gripping portion G in accordance with the present invention is shown in FIGS. 4 and 5. A cutting tool, preferably shown as a laser beam B emitted from a laser gun assembly 20 is first directed against one side 5 of the handle 2. The laser beam B is moved at an angle to the handle 2 in a series of parallel passes across the handle 2 to form a plurality of the grooves 9 parallel to each other. It will be noted that the laser gun assembly 20 and its beam B moves in the same direction at spaced intervals along handle 2 to form spaced grooves 9. When all the spaced grooves 9 oriented in one direction are formed, the laser gun assembly 20 and it laser beam B is then reversed and is moved in the opposite direction (at approximately 90 degrees to the first direction) to make a series of parallel passes to form the plurality of grooves 10 which intersect the grooves 9. This forms the cross hatched groove network 4 which is on the gripping portion G. Thus, the parallel grooves 9 are first formed in one direction and the parallel grooves 10 are then formed in the opposite direction so that the grooves 9 and 10 cross intersect each other at right angles to form the cross hatched groove network 4. It will be understood that while the invention has been described as first forming the set of parallel grooves 9 and thereafter forming the other set of parallel grooves 10 second, it is within the scope of the present invention to first form grooves 10 and then form grooves 9.

After the cross-hatched groove network 4 comprising grooves 9 and 10 are formed on the face 5, the laser beam B is directed against the opposite face 6 of the handle to form grooves 9 and 10 on the opposite face 6 in the same manner. This may be done by turning the handle around or by moving the laser gun assembly 20 underneath handle 2 to apply beam B against face 6.

It will thus be seen that the present invention provides an improved mechanism and method of making an anti-slip handle which is simple and inexpensive to manufacture which will use existing machinery.

As many varied modifications of the subject matter of this invention will become apparent to those skilled in the art from the detailed description given hereinabove, it will be understood that the present invention is limited only as provided in the claims appended hereto.

The embodiments of the invention in which an exclusive Property or privilege is claimed are defined as follows:

1. The method of making an anti-slip handle having a gripping portion which comprises forming a plurality of grooves in the gripping portion of the handle; forming a first set of grooves in one direction and forming a second set of said grooves in the other direction whereby the two sets of grooves intersect each other to form a cross-hatched groove network.

2. The method as set forth in claim 1 wherein the grooves in each set are formed parallel to each other.

3. The method as set forth in claim 2 wherein the first set of grooves are formed by moving a groove forming means in one direction and the second set of grooves are formed by moving a groove forming means in the other direction.

4. The method as set forth in claim 3 wherein the groove-forming means is moved in parallel passes in one direction and thereafter moved in parallel passes in the opposite direction.

5. The method as set forth in claim 4 wherein a cross-hatched groove network is first formed on one side of the handle and the other cross-hatched groove network is formed on another side of the handle.

6. The method as set forth in claim 5 wherein the groove forming means are moved at right angles to each other to form the grooves at a right angle to each other.

7. The method as set forth in claim 6 wherein said notches are formed by directing a laser beam onto each side of the handle.

8. The method a set forth in claim 7 wherein the grooves are approximately between 0.01 and 0.02 millimeters deep.

9. The method as set forth in claim 8 wherein the length of each groove is approximately 1 ½ inches.

10. The method as set forth in claim 9 wherein the distance between adjacent grooves is approximately 0.16 millimeters.

11. The method as set forth in claim 10 wherein the parallel rows of grooves extend along the gripping portion of the handle for approximately 7 inches.

12. The method as set forth in claim 11 wherein the width of the cross-hatched groove network formed by the groove is approximately 1 ¼ inches.

\* \* \* \* \*